US012801933B2

(12) United States Patent
Hong et al.

(10) Patent No.: US 12,801,933 B2
(45) Date of Patent: Nov. 17, 2026

(54) APPARATUS AND METHOD FOR TACKLING DATA HETEROGENEITY IN FEDERATED LEARNING USING INTERMEDIATE LAYER REPRESENTATION REGULARIZATION

(71) Applicant: University-Industry Cooperation Group of Kyung Hee University, Gyeonggi-do (KR)

(72) Inventors: Choong Seon Hong, Gyeonggi-do (KR); Seong Bae Park, Seoul (KR); Jin Seon Park, Gyeonggi-do (KR); Tun Ye Lin, Gyeonggi-do (KR)

(73) Assignee: University-Industry Cooperation Group of Kyung Hee University, Gyeonggi-do (KR)

( * ) Notice: Subject to any disclaimer, the term of this patent is extended or adjusted under 35 U.S.C. 154(b) by 484 days.

(21) Appl. No.: 18/509,725

(22) Filed: Nov. 15, 2023

(65) Prior Publication Data

US 2024/0296341 A1 Sep. 5, 2024

(30) Foreign Application Priority Data

Nov. 15, 2022 (KR) ........................ 10-2022-0152754
Mar. 7, 2023 (KR) ........................ 10-2023-0029872

(51) Int. Cl.
*G06N 3/00* (2023.01)
*G06N 3/098* (2023.01)

(52) U.S. Cl.
CPC .................................... *G06N 3/098* (2023.01)

(58) Field of Classification Search
None
See application file for complete search history.

(56) References Cited

U.S. PATENT DOCUMENTS

| | | | | |
|---|---|---|---|---|
| 2015/0052125 | A1* | 2/2015 | Ellis | G06F 16/248<br>707/724 |
| 2020/0285980 | A1* | 9/2020 | Sharad | G06N 3/098 |
| 2021/0097977 | A1* | 4/2021 | Aher | G10L 15/22 |
| 2021/0374617 | A1* | 12/2021 | Chu | G06N 3/084 |
| 2022/0108177 | A1* | 4/2022 | Samek | G06N 3/08 |
| 2022/0294757 | A1* | 9/2022 | Khasanova | H04L 61/4511 |

(Continued)

FOREIGN PATENT DOCUMENTS

| | | | |
|---|---|---|---|
| CN | 115145966 | A | 10/2022 |
| KR | 10-2021-0150293 | A | 12/2021 |

OTHER PUBLICATIONS

T Nishio, R Yonetani (Client selection for federated learning with heterogeneous resources in mobile edge) ICC 2019—2019 IEEE international conference on communications (ICC), 2019•ieeexplore. ieee.org. (Year: 2019).*

(Continued)

*Primary Examiner* — Hafiz A Kassim
(74) *Attorney, Agent, or Firm* — The PL Law Group, PLLC

(57) ABSTRACT

A federated learning method performed by a server and a terminal includes transmitting, by the server, a global model to a terminal and receiving, by the server, a local parameter from the terminal. The local parameter may be determined by the terminal obtaining at least one model of a previous model and a global model, obtaining a representation of the obtained model, and updating a current model using the representation.

3 Claims, 6 Drawing Sheets

(56) References Cited

U.S. PATENT DOCUMENTS

| | | | | |
|---|---|---|---|---|
| 2022/0335303 | A1* | 10/2022 | Haidar | G06N 3/082 |
| 2022/0351039 | A1* | 11/2022 | Satheesh Kumar | G06N 3/08 |
| 2022/0414464 | A1* | 12/2022 | Krishnaswamy | G06N 3/09 |
| 2023/0093067 | A1* | 3/2023 | Lin | G06N 20/20 706/12 |
| 2023/0101741 | A1* | 3/2023 | Yoo | G16H 50/30 706/10 |
| 2023/0316141 | A1* | 10/2023 | Toporek | G16H 10/60 706/12 |
| 2024/0005216 | A1* | 1/2024 | Radhakrishnan | G06F 11/3495 |

OTHER PUBLICATIONS

Office action issued on Nov. 11, 2025 from Korean Patent Office in a counterpart Korean Patent Application No. 10-2023-0029872 (all the cited references are listed in this IDS.) (English translation is also submitted herewith.).

Ha Min Son et al., "Compare Where It Matters: Using Layer-Wise Regularization to Improve Federated Learning on Heterogeneous Data", 2021, Sungkyunkwan University (arXiv:2112.00407v1).

Xiaosong Ma et al., "Layer-wised Model Aggregation for Personalized Federated Learning", 2022, (arXiv:2205.03993v1).

* cited by examiner

FIG. 3

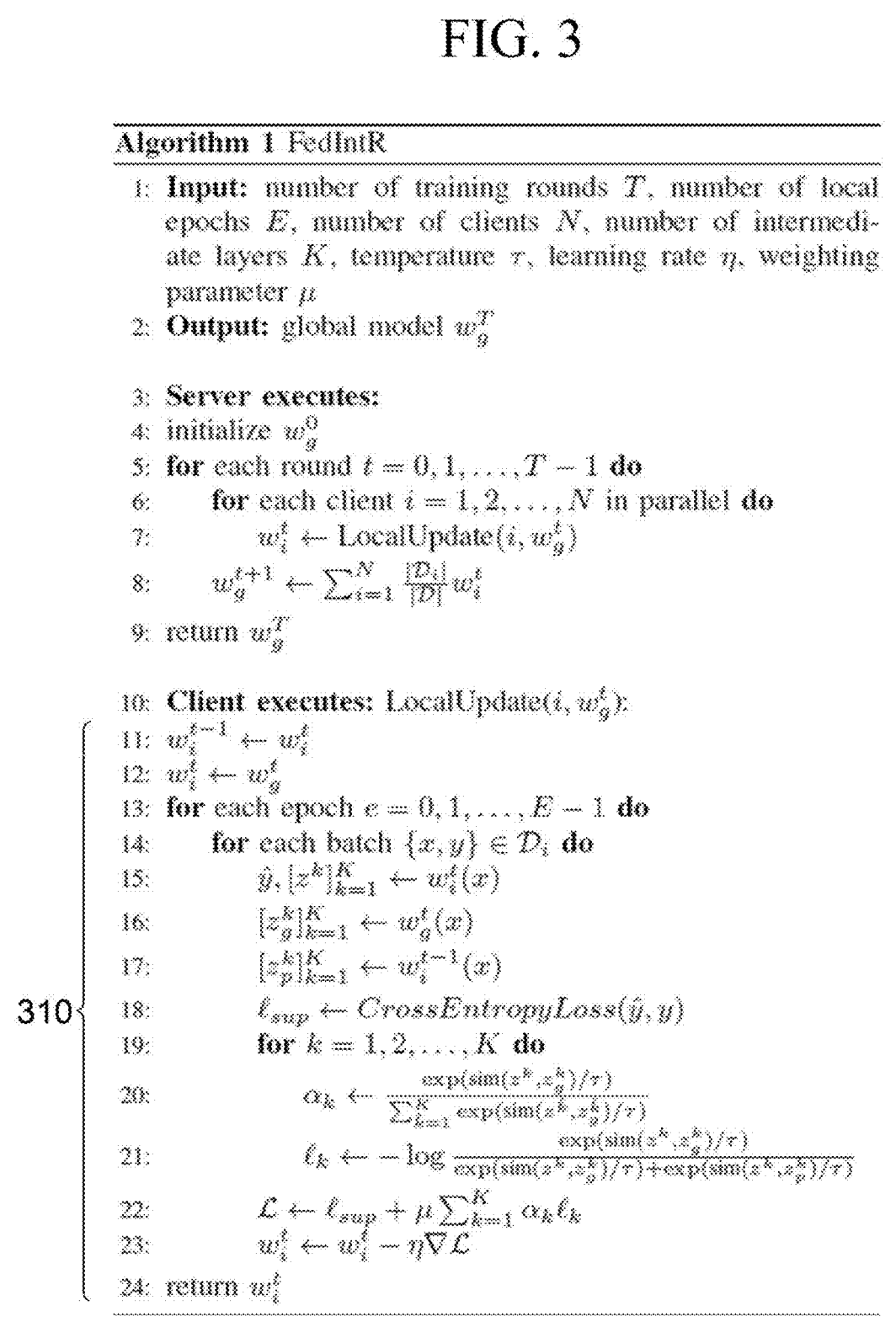

Algorithm 1 FedIntR

Input: number of training rounds $T$, number of local epochs $E$, number of clients $N$, number of intermediate layers $K$, temperature $\tau$, learning rate $\eta$, weighting parameter $\mu$

Output: global model $w_g^T$

Server executes:

initialize $w_g^0$ for each round $t = 0, 1, \ldots, T-1$ do for each client $i = 1, 2, \ldots, N$ in parallel do

$w_i^t \leftarrow \text{LocalUpdate}(i, w_g^t)$ $w_g^{t+1} \leftarrow \sum_{i=1}^{N} \frac{|\mathcal{D}_i|}{|\mathcal{D}|} w_i^t$ return $w_g^T$

Client executes: $\text{LocalUpdate}(i, w_g^t)$:

310

$w_i^{t-1} \leftarrow w_i^t$ $w_i^t \leftarrow w_g^t$ for each epoch $e = 0, 1, \ldots, E-1$ do for each batch $\{x, y\} \in \mathcal{D}_i$ do

$\hat{y}, [z^k]_{k=1}^K \leftarrow w_i^t(x)$ $[z_g^k]_{k=1}^K \leftarrow w_g^t(x)$ $[z_p^k]_{k=1}^K \leftarrow w_i^{t-1}(x)$ $\ell_{sup} \leftarrow CrossEntropyLoss(\hat{y}, y)$ for $k = 1, 2, \ldots, K$ do

$\alpha_k \leftarrow \frac{\exp(\text{sim}(z^k, z_g^k)/\tau)}{\sum_{k=1}^K \exp(\text{sim}(z^k, z_g^k)/\tau)}$ $\ell_k \leftarrow -\log \frac{\exp(\text{sim}(z^k, z_g^k)/\tau)}{\exp(\text{sim}(z^k, z_g^k)/\tau) + \exp(\text{sim}(z^k, z_p^k)/\tau)}$ $\mathcal{L} \leftarrow \ell_{sup} + \mu \sum_{k=1}^K \alpha_k \ell_k$ $w_i^t \leftarrow w_i^t - \eta \nabla \mathcal{L}$ return $w_i^t$

APPARATUS AND METHOD FOR TACKLING DATA HETEROGENEITY IN FEDERATED LEARNING USING INTERMEDIATE LAYER REPRESENTATION REGULARIZATION

SPONSORED RESEARCH AND DEVELOPMENT

National research and development program that supported this invention (1)
Project identification number: 1711194179
Project number: 00207816
Name of Ministry: Ministry of Science and ICT
Name of project management (professional) organization: National Research Foundation of Korea
Research program name: Group research support
Research project name: Development of core structure of Satellite-Air-Ground integrated networking system based on Meta Federated Learning
Contribution rate: ¼
Project carrying out organization name: Kyung Hee University Industry-Academic Cooperation Foundation
Research period: 2023-03-01~2024-02-29
National research and development program that supported this invention (2)
Project identification number: 1711193491
Project t number: 2019-0-01287-005
Name of Ministry: Ministry of Science and ICT
Project management (professional) organization name: Information and Communications Planning and Evaluation Institute
Research program name: SW computing industry source technology development
Research project name: (SW Star Lab) Evolutionary deep learning model generation platform for distributed edge
Contribution rate: ¼
Project carrying out organization name: Kyung hee University Industry-Academic Cooperation Foundation
Research period: 2023.01.01~2023.12.31
National research and development program that supported this invention (3)
Project identification number: 1711193622
Project number: 2021-0-02068-003
Name of Ministry: Ministry of Science and ICT
Project management (professional) organization name: Information and Communications Planning and Evaluation Institute
Research program name: Information and Communication Broadcasting Innovative Human Resources Training
Research project name: Artificial intelligence innovation hub research and development
Contribution rate: ¼
Project carrying out organization name: Korea University Industry-Academic Cooperation Foundation
Research period: 2023.01.01~2023.12.31
National research and development program that supported this invention (4)
Project identification number: 1711179316
Project number: 00155911
Name of Ministry: Ministry of Science and ICT
Project management (professional) organization name: Information and Communications Planning and Evaluation Institute
Research program name: Artificial intelligence convergence innovation human resources training
Research project name: Artificial intelligence convergence innovation talent training (Kyung Hee University)
Contribution rate: ¼
Project carrying out organization name: Kyung Hee University Industry-Academic Cooperation Foundation
Research period: 2023.01.01~2023.12.31

BACKGROUND

1. Field

This specification discloses a neural network model learning method.

2. Background Art

Real-world data essential for enhancing intelligent services is distributed across numerous edge devices (e.g., IoT devices, personal smartphones, or data storage spaces in different organizations) Deep learning may benefit from large data sets generated by bulk collection, but a server may be prohibited from acquiring data from edge devices as security concerns and privacy regulations increase. This may cause some limitations in centralized training of deep neural network models.

Federated learning (FL), which allows edge devices to collaboratively train models without sharing data with a central server, turns out to be a viable option to meet these requirements. In particular, the Federated Averaging (FedAvg) algorithm has emerged as an approach for model training in distributed environments with data privacy concerns. FedAvg works by allowing each edge device to train a local model with its own data before sending a trained parameter to the server. The server aggregates a received parameter into a single global model that inherits a trained function of the local model.

In fact, in an FL system, large data heterogeneity can occur because local data of each device varies depending on the characteristics and operation of the device. Heterogeneous data have a major problem causing slow convergence and unoptimized model performance in federated learning.

SUMMARY

In order to solve the problems described above, embodiments of the present disclosure propose measures for preventing model performance degradation due to heterogeneous data in federated learning.

In order to solve the problem described above, this specification discloses a model learning method performed by a terminal according to an embodiment. The model learning method according to an embodiment includes obtaining at least one model of a previous model and a global model, obtaining a representation of the obtained model, and updating a current model using the representation. The terminal may be configured to include a memory and a processor.

According to the embodiment, the representation may be obtained for each intermediate layer constituting the obtained model.

According to the embodiment, a previous model, a global model and a current model may be determined, a representation may be obtained for the previous model, the global model and the current model, and the current model may be updated based on the representation obtained for the previous model, the global model, and the current model.

According to the embodiment, the current model may be updated based on a representation loss, and the representation loss may be determined based on at least one of a similarity between the representation obtained from the previous model and the representation obtained from the current model and a similarity between the representation obtained from the current model and the representation obtained from the global model.

According to the embodiment, the representation loss may be determined for each layer constituting the current model.

According to the embodiment, the current model may be updated by applying a weight to the representation loss, and the weight may be determined for each layer constituting the current model.

According to the embodiment, the representation of the obtained model may be determined by performing computation of calculating a predetermined value on an intermediate layer result value of the obtained model.

According to the embodiment, the representation loss may be determined as a value that lowers the similarity between the representation obtained from the previous model and the representation obtained from the current model, and increases the similarity between the representation obtained from the current model and the representation obtained from the global model.

According to the embodiment, the weight may be determined based on the similarity between the representation obtained from the current model and the representation obtained from the global model.

Further, in order to solve the above problem, this specification discloses a terminal including a memory and a processor according to another embodiment. In the terminal, the processor may obtain at least one model of a previous model and a global model, obtains a representation of the obtained model, and updates a current model using the representation.

Further, in order to solve the above problem, this specification discloses a model learning method performed by a server according to still another embodiment. The model learning method performed by the server includes transmitting a global model to a terminal, and receiving a local parameter from the terminal. The local parameter may be determined by the terminal obtaining at least one model of a previous model and a global model, obtaining a representation of the obtained model, and updating a current model using the representation. The server may be configured to include a communicator and a processor.

The method performed by the terminal and/or server described above may be provided by being recorded on a computer-readable recording medium in the form of a computer program for performing the method.

This specification discloses measures for introducing a regularization term into a local training process of federated learning as a simple and effective method for preventing model performance degradation due to heterogeneous data in federated learning. The regularization term can be calculated based on a representation extracted from an intermediate layer of a deployed model. For example, utilizing representations of all intermediate layers and assigning an appropriate weight to respective contributions thereof can provide more granular regularization to the training process.

FedIntR disclosed herein can be implemented by incorporating regularization into the local training process. Self-supervised learning with additional loss across the intermediate layers can improve the performance of the model on downstream tasks. By incorporating the intermediate representation into the FL process, more effective regularization for the data heterogeneity problem can be implemented.

Further, FedIntR can be considered a general approach that does not require manual selection of layers to be included in regularization, because FedIntR automatically determines the contribution of different intermediate layers to regularization based on the similarity between local and global representations.

With this, distributed edge devices (e.g., IoT devices, smartphones, data storage space, etc.) can jointly train models that can provide intelligent services using a federated learning mechanism having greater tolerance to data heterogeneity problems.

BRIEF DESCRIPTION OF THE DRAWINGS

FIG. 3 is a diagram illustrating a FedIntR algorithm.

DETAILED DESCRIPTION

Figure 1:
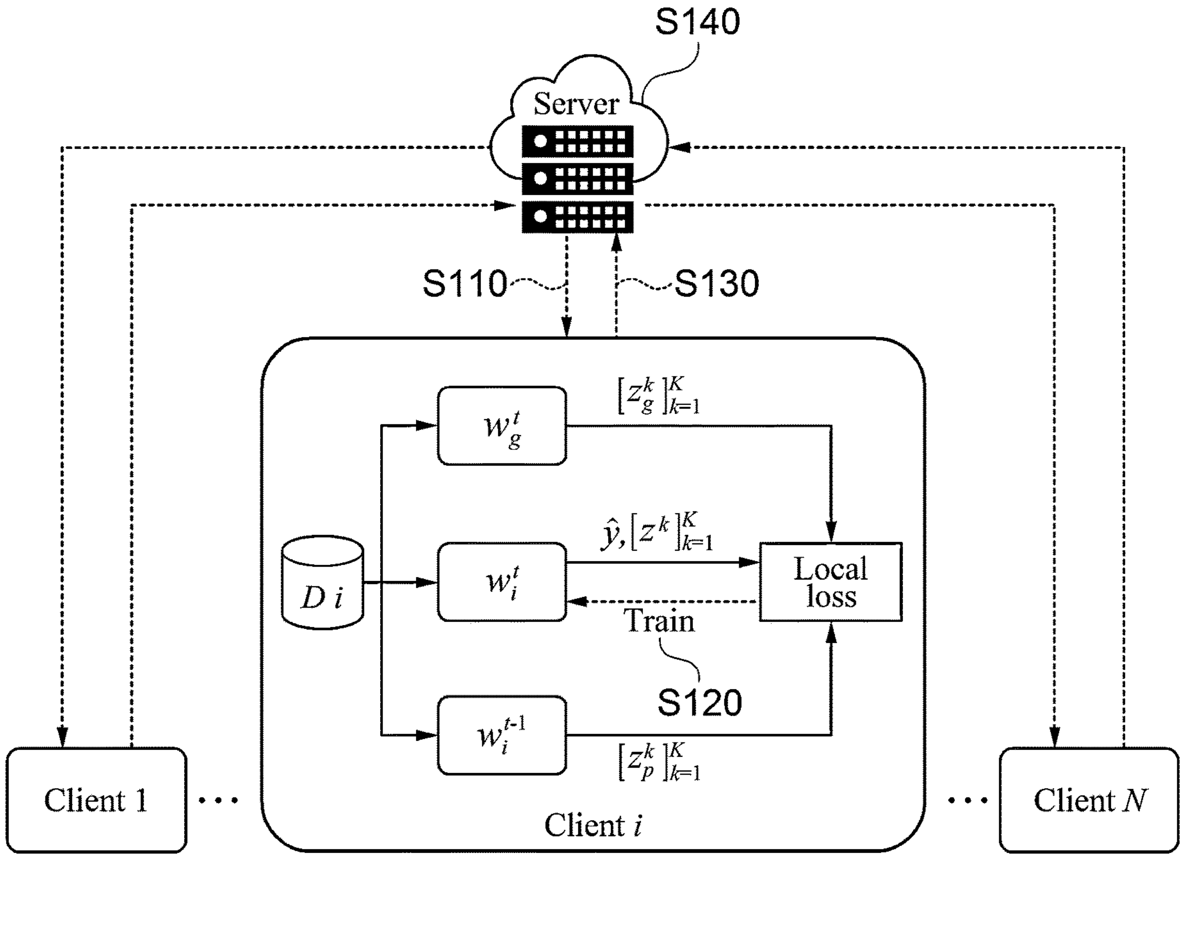
FIG. 1 is a diagram illustrating an example of federated learning.

Hereinafter, a specific embodiment of the present disclosure will be described with reference to the drawings. The following detailed description is provided to aid in a comprehensive understanding of the methods, apparatus and/or systems described herein. However, this is illustrative only, and the present disclosure is not limited thereto.

In describing the embodiments of the present disclosure, when it is determined that a detailed description of related known technologies may unnecessarily obscure the subject matter of the present disclosure, a detailed description thereof will be omitted. In addition, terms to be described later are terms defined in consideration of functions in the present disclosure, which may vary according to the intention or custom of users or operators. Therefore, the definition should be made based on the contents throughout this specification. The terms used in the detailed description are only for describing embodiments of the present disclosure, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, some or combinations thereof, other than those described.

In the following description, "transfer," "communication," "transmission," "reception," of a signal or information and other terms having similar meaning include not only direct transmission of a signal or information from one component to another component, but also transmission of the signal or information through another component. In particular, "transferring" or "transmitting" a signal or information to a component indicates a final destination of the signal or information and does not mean a direct destination. This is the same for "receiving" a signal or information. In addition, in this specification, the fact that two or more pieces of data or information are "related" means that if one data (or information) is acquired, at least part of the other data (or information) can be obtained based on it.

In addition, terms such as first, second, etc. may be used to describe various components, but the components should not be limited by the terms. Terms may be used for the purpose of distinguishing one component from another. For example, a first component may be referred to as a second component, and similarly, the second component may also be referred to as a first component without departing from the scope of the present disclosure.

Utilizing the representation of at least one intermediate layer and assigning an appropriate weight to each contribution can provide more fine-grained regularization to the training process. Hereinafter, an idea of using the representation extracted from the intermediate layer to overcome the performance degradation caused by non-independent and identically distributed (non-IID) data of the FL will be described. In this specification, a method of enhancing the similarity between intermediate layer representations of the local model and the global model is presented. This is referred to as the Federated learning Intermediate Representations (FedIntR) algorithm (hereinafter referred to as "FedIntR"). In one embodiment, FedIntR can calculate a regularization term based on contrast loss using the local and global intermediate representations. In addition, FedIntR can also automatically calculate layer-wise weights to determine the degree to which each intermediate layer contributes to the regularization term. In addition, FedIntR may assign a greater contribution weight to a layer having a higher global and local representation similarity.

FIG. 1 is a diagram illustrating an example of federated learning using FedIntR. FedIntR trains a global model $w_g$ by solving the following problems.

$$w_g^* = \operatorname{argmin}_{w_g} \sum_{i=1}^{N} \frac{|\mathcal{D}_i|}{|\mathcal{D}|} \mathcal{L}_i(w_g), \quad \text{[Equation 1]}$$

Here, $\mathcal{L}_i$ is a local loss of an i-th client, $D_i$ is a data set of the i-th client, N represents the total number of clients, and $$|\mathcal{D}| = \sum_{i=1}^{N} |\mathcal{D}_i|.$$

Besides the cross-entropy loss, FedIntR adds a regularization term calculated with the help of the intermediate representation of a global model $$w_g^t$$

and a local model $$w_i^{t-1}$$

in the previous round.

FedIntR according to an embodiment may be implemented by incorporating regularization into a local training stage of FedAvg. For example, FedIntR can be implemented by incorporating regularization into the local training second stage of FedAvg. For example, FedIntR can be implemented by modifying a local training process of vanilla FedAvg. Vanilla FedAvg is a known algorithm, and thus description thereof is omitted.

Referring to FIG. 1, four main steps can be performed for each training round t. First, a central server can distribute the global model $$w_g^t$$

to a client i (S110). Next, the client i can train the local model $$w_i^t$$

for personal data $D_i$ (S120). Here, the local model $$w_i^t$$

may be a model regularized by the intermediate representations in the global model $$w_g^t$$

and a previous local model $$w_i^{t-1}.$$

Next, the trained local model can be returned to the server (S130). Next, the server can aggregate local parameters received from the respective clients in order to update the global model $$w_g^{t+1}$$

(S140).

Figure 2:
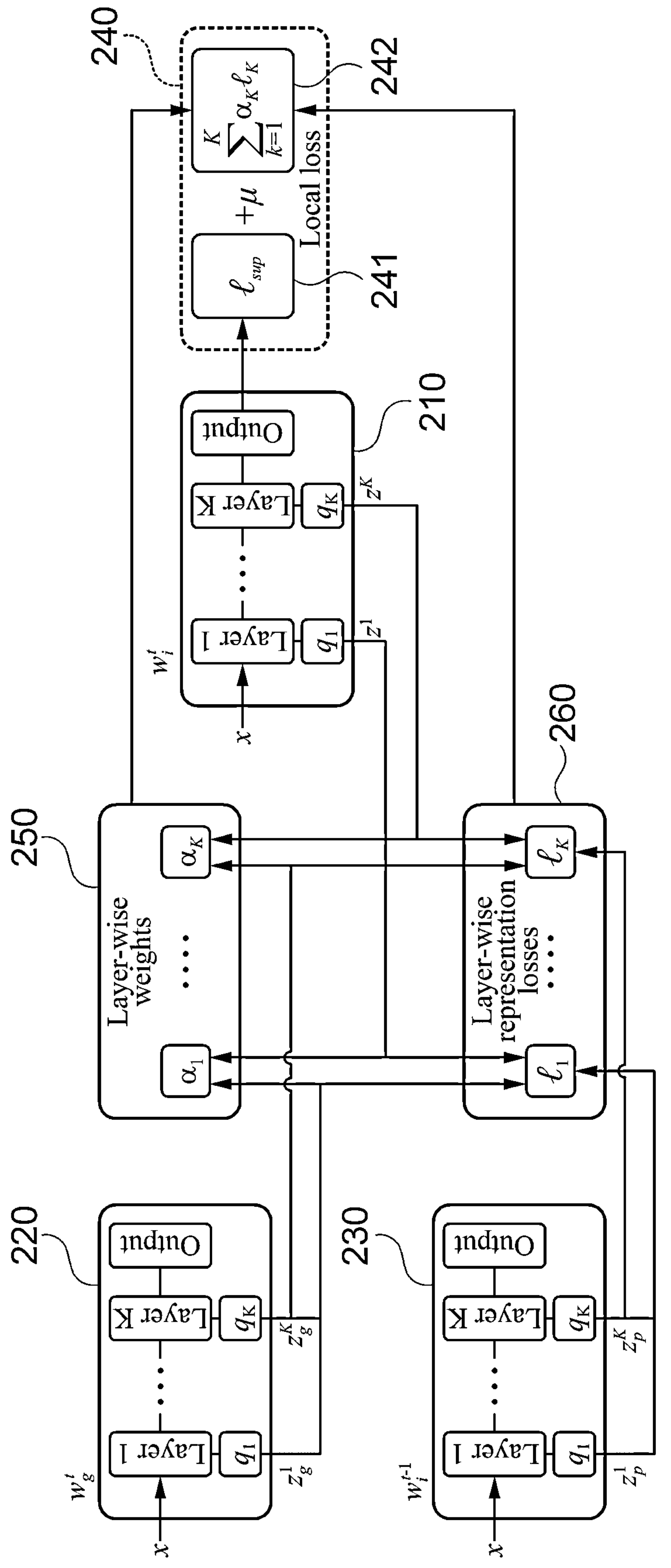
FIG. 2 is a diagram illustrating a local loss calculation method.

FIG. 2 is a diagram illustrating a local loss calculation method of FedIntR. As illustrated in FIG. 2, FedIntR can calculate a regularization term 242 using intermediate representation z of a local model $$w_i^t$$

210, a global model $$w_g^t$$

220, and a previous local model $$w_i^{t-1}$$

230. More specifically, in FIG. 2, the intermediate representation z of the local model $$w_i^t$$

210 is illustrated as $z^1, \ldots, z^K$, the intermediate representation z of the global model $$w_g^t t$$

220 is illustrated as $z_g^1, \ldots, z_p^K$, and the intermediate representation z of the previous local model $$w_i^{t-1}$$

230 is illustrated as $z_p^1, \ldots, z_p^K$. A weight 250 and a representation loss 260 can be calculated for each layer using the intermediate representation z. Then, the regularization term 242 can be calculated using the weight and the representation loss. A local training loss 240 can be calculated by adding this regularization term 242 and a cross-entropy loss $l_{sup}$ 241. One embodiment of FedIntR can be described in pseudo code as illustrated in FIG. 3.

The FedIntR algorithm in FIG. 3 will be described in more detail. A local training process 310 begins with the i-th client receiving the global model $$w_g^t$$

from the central server. The client synchronizes the previous local model $$w_i^{t-1}$$

with the current model $$w_i^t$$

(the model to be trained) and then synchronizes $$w_i^t$$

with $$w_g^t.$$

It is assumed that the developed model structure contains a total of K layers (e.g., convolutional or fully connected layers) from which representations can be extracted. Given an input x, FedIntR extracts representations $z^k$, $$z_p^k,$$

and $$z_g^k$$

from k-th layers of the current local model $$w_i^t,$$

the previous local model $$w_i^{t-1},$$

and the global model $$w_g^t,$$

respectively. Extraction of the representation can be performed by passing an output of the layer through projection heads $q_1$ to $q_k$ to obtain the representation, as illustrated in FIG. 2. Here, the projection head q may consist of at least one (dense) layer, and the obtained representation z may be obtained in the form of a numeric vector.

FedIntR can calculate the representation loss for the k-th layer using the equation below.

$$\ell_k = -\log\frac{\exp\left(sim\left(z^k, z_g^k\right)/\tau\right)}{\exp\left(sim\left(z^k, z_g^k\right)/\tau\right) + \exp\left(sim\left(z^k, z_p^k\right)/\tau\right)}, \quad \text{[Equation 2]}$$

Here, τ is a temperature parameter and sim( ) is a similarity function. A cosine similarity function below can be used as the similarity function.

$$sim(z_i, z_j) = \frac{z_i}{\|z_i\|_2} \cdot \frac{z_j}{\|z_j\|_2}. \quad \text{[Equation 3]}$$

Equation 2 will be described in more detail. The layer-wise representation loss $l_k$ encourages the local representation $z^k$ to move further away from $$z_p^k$$

and closer to the global representation $$z_g^k.$$

Through this, the regularization term can maximize the distance between the local representation $z^k$ and the previous local representation $$z_p^k,$$

and minimize the distance between the local representation $z^k$ and the global representation $$z_g^k.$$

The layer-wise representation loss $l_k$ is calculated for the k-th layer of the model, and may have different importance for each layer. Therefore, a different weight $\alpha$ may be assigned to each layer-wise representation loss $l_k$. A layer-wise weight $\alpha_k$, which represents the contribution of $l_k$ to the regularization term, is determined based on the similarity of $z^k$ and $$z_g^k$$

using the softmax function. For example, if the k-th layer has a higher similarity between $z^k$ and $$z_g^k$$

than other layers, the representation loss $l_k$ of that layer may be assigned a higher weight. Specifically, $\alpha_k$ can be calculated as follows.

$$\alpha_k = \frac{\exp\left(sim\left(z^k, z_g^k\right)/\tau\right)}{\sum_{\hat{k}=1}^{K}\exp\left(sim\left(z^{\hat{k}}, z_g^{\hat{k}}\right)/\tau\right)}, \quad \text{[Equation 4]}$$

Here, $$\sum_{k=1}^{K}\alpha_k \text{ is } 1.$$

FedIntR calculates $\alpha_k$ and $l_k$ for all layers $k \in [1, 2, \ldots, K]$. After that, $$[\alpha_k]_{k=1}^{K}$$

and $$[\ell_k]_{k=1}^{K}$$

can be incorporated into the local training loss as regularization terms. Local loss $\mathcal{L}$ is defined as (5) and can be calculated using the equation below.

$$\mathcal{L} = \ell_{sup} + \mu\sum_{k=1}^{K}\alpha_k\ell_k \quad \text{[Equation 5]}$$

Here, $l_{sup}$ represents the cross-entropy loss and the second element is a regularization term having $\mu$ which is a balancing parameter.

Figure 4:
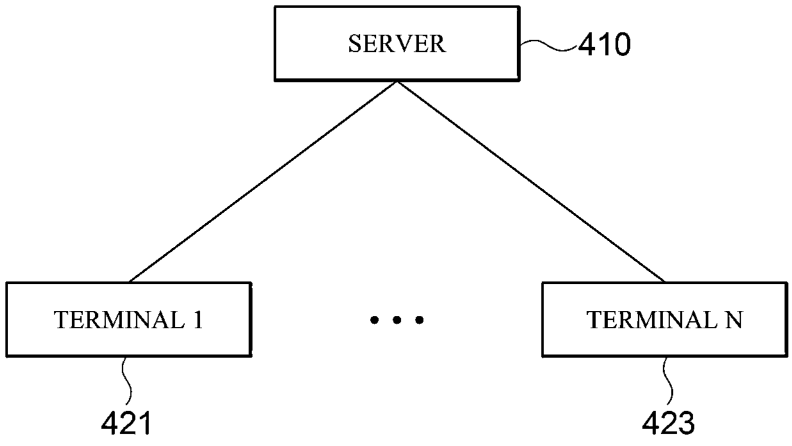
FIG. 4 is a diagram illustrating a server-terminal architecture according to an embodiment.

FIG. 4 is a diagram illustrating a server-terminal architecture according to an embodiment. The federated learning method according to an embodiment can be performed by adopting FedIntR described above. A system for the federated learning may be configured to include a server 410 and at least one terminal 421, . . . , 423, as illustrated in FIG. 4. The system may be configured to include one terminal or N terminals.

Figure 5:
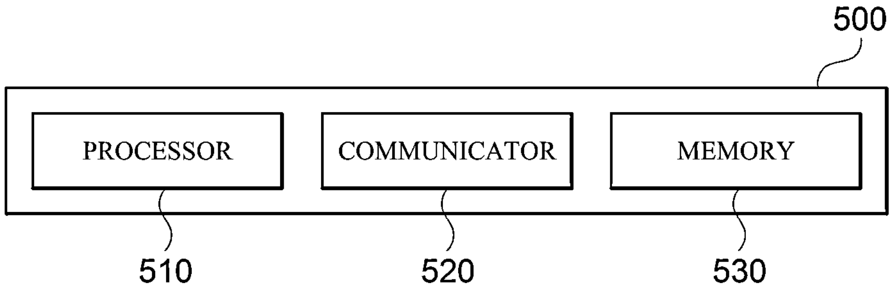
FIG. 5 is a diagram illustrating a configuration of a server and a configuration of a terminal according to an embodiment.

FIG. 5 is a diagram illustrating the configuration of the server and the configuration of the terminal according to an embodiment. FIG. 5 is a diagram illustrating a minimum configuration that the server can have. The server may be configured to include a processor 510, a communicator 520, and a memory 500, as illustrated in FIG. 5. The terminal may also be configured to include the processor 510, the communicator 520, and the memory 500, as illustrated in FIG. 5. The server and the terminal can perform data communication through the communicator included in the server and the terminal. The server and terminal can perform federated learning using the processor and the memory included in the server and terminal.

Figure 6:
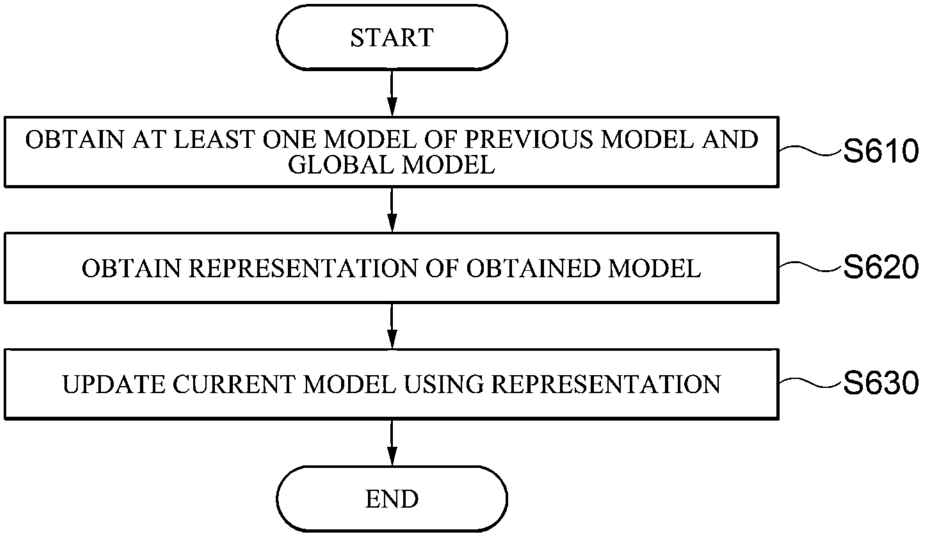
FIG. 6 is a diagram illustrating a method for updating a model by the terminal according to an embodiment.

For example, the processor of the terminal may operate in order for the terminal to perform the following model learning method. FIG. 6 is a diagram illustrating a method for updating a model by the terminal according to an embodiment. The model learning method performed by the terminal according to an embodiment may be performed including obtaining at least one model of the previous model and the global model (S610), obtaining a representation of the obtained model (S620), and updating a current model using the representation (S630). And, the terminal can use the communicator to receive the global model from the server and transmit the local parameter constituting the updated current model to the server.

More specifically, the representation may be obtained for each intermediate layer constituting the obtained model. For example, the representation can be determined by performing computation of calculating a predetermined value on an intermediate layer result value of the obtained model.

In addition, a previous model, a global model and a current model may be determined, a representation may be obtained for the previous model, the global model and the current model, and the current model may be updated based on the representation obtained for the previous model, the global model, and the current model.

The current model may be updated based on a representation loss, and the representation loss may be determined based on at least one of a similarity between the representation obtained from the previous model and the representation obtained from the current model and a similarity between the representation obtained from the current model and the representation obtained from the global model. The representation loss may be determined for each layer constituting the current model.

The representation loss may be determined as a value that lowers the similarity between the representation obtained from the previous model and the representation obtained from the current model, and increases the similarity between the representation obtained from the current model and the representation obtained from the global model.

The current model may be updated by applying a weight to the representation loss. The weight may be determined for each layer constituting the current model. The weight may be determined based on the similarity between the representation obtained from the current model and the representation obtained from the global model.

Figure 7:
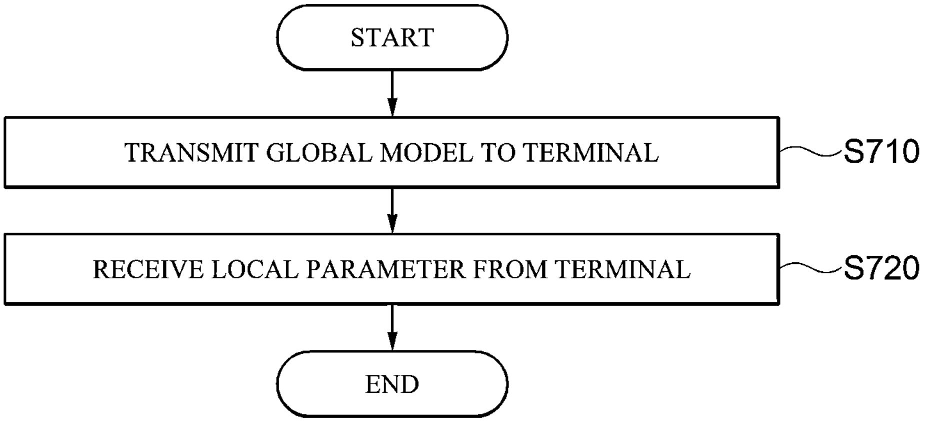
FIG. 7 is a diagram illustrating a method for updating a model by the server according to an embodiment.

In addition, the server according to an embodiment includes a communicator and a processor, and each component of the server can operate in order for the server to perform the following model learning method. FIG. 7 is a diagram illustrating a method for updating a model by the server according to an embodiment. For example, the model learning method performed by the server may include transmitting the global model to the terminal (S710) and receiving the local parameter from the terminal (S720). Here, the local parameter may be determined by the terminal obtaining at least one model of a previous model and a global model, obtaining a representation of the obtained model, and updating a current model using the representation.

Figure 8:
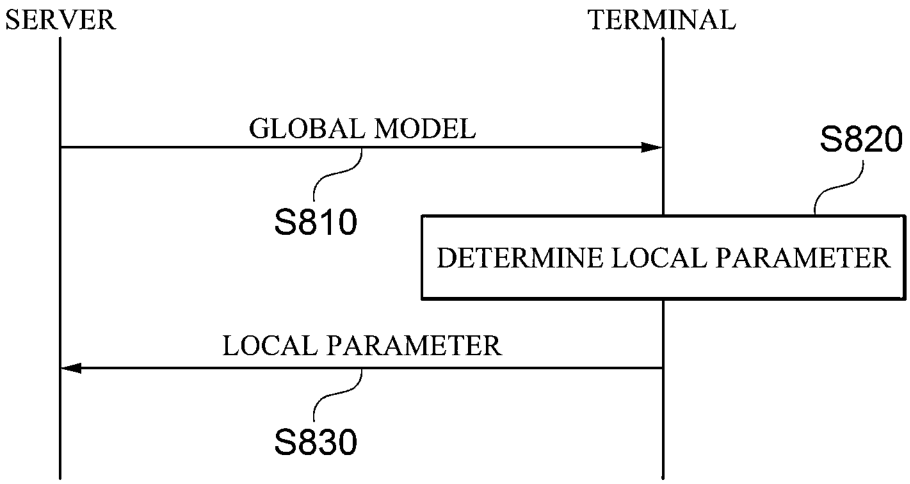
FIG. 8 is a diagram illustrating data exchange between the server and the terminal according to an embodiment.

FIG. 8 is a diagram illustrating data exchange between the server and the terminal according to an embodiment. The server may transmit the global model to the terminal (S810). Next, the terminal can determine the local parameter using the received global model (S820). This can be performed as described with reference to FIG. 6. For example, as described above, the terminal can determine the local parameter by updating the model using the representations of the previous model, the global model, and the current model (S820). Next, the terminal can transmit the local parameter to the server (S830).

As described above, the federated learning method using FedIntR can be implemented by performing model learning by the server and the terminal that integrates regularization into the local training process. Self-supervised learning with additional loss across intermediate layers can improve the performance of the model on downstream tasks. By incorporating intermediate representations into the FL process, more effective regularization for the data heterogeneity problem can be implemented.

As described above, in federated learning, the representation of the intermediate layers of the entire model structure can be used to regularize the local training process. With this, the necessity of manual determination on the intermediate layer to be included in the regularization process may be negated. In addition, more information could be incorporated into the regularization process to effectively guide the local training process.

As described above, the weights may be assigned to different intermediate layers of the model in order to determine their contribution to the regularization term. The contribution weight for each intermediate layer may be calculated as a different value for each layer, as described above. With this, it is possible to avoid performance degradation of the global model that occurs due to assigning the same contribution weight (i.e., taking the average of all intermediate representation losses as regularization).

In addition, the contribution of each layer to the regularization term may not be determined manually, in that the contribution of each intermediate layer can be calculated using the similarity between the local intermediate representation and the global intermediate representation.

In this specification, a module may mean a functional and structural combination of hardware for carrying out the technical idea of the present invention and software for driving the hardware. For example, the "module" may mean a predetermined code and a logical unit of a hardware resource for executing the predetermined code, and does not necessarily mean a physically connected code or a single type of hardware.

Figure 9:
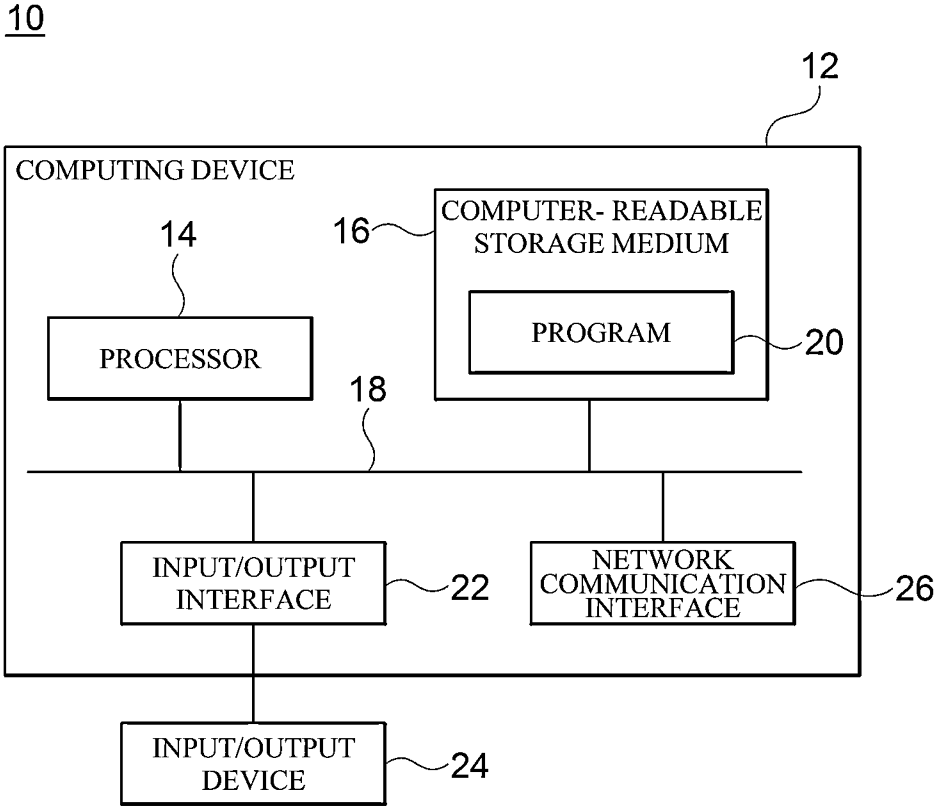
FIG. 9 is an exemplary diagram for describing an environment in which a base station operates according to an embodiment.

FIG. 9 is a block diagram for illustratively describing a computing environment 10 including a computing device suitable for use in exemplary embodiments. In the illustrated embodiment, respective components may have different functions and capabilities other than those described below, and may include additional components in addition to those described below.

The illustrated computing environment 10 includes a computing device 12. In an embodiment, the computing device 12 may be the base station. The computing device 12 includes at least one processor 14, a computer-readable storage medium 16, and a communication bus 18. The processor 14 may cause the computing device 12 to operate according to the exemplary embodiment described above. For example, the processor 14 may execute one or more programs stored on the computer-readable storage medium 16. The one or more programs may include one or more computer-executable instructions, which, when executed by the processor 14, may be configured so that the computing device 12 performs operations according to the exemplary embodiment.

The computer-readable storage medium 16 is configured so that the computer-executable instruction or program code, program data, and/or other suitable forms of information are stored. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a speech or sound input device, input devices such as various types of sensor devices and/or photographing devices, and/or output devices such as a display device, a printer, a speaker, and/or a network card. The exemplary input/output device 24 may be included inside the computing device 12 as a component configuring the computing device 12, or may be connected to the computing device 12 as a separate device distinct from the computing device 12.

Although representative embodiments of the present disclosure have been described in detail, a person skilled in the art to which the present disclosure pertains will understand that various modifications may be made thereto within the limits that do not depart from the scope of the present disclosure. Therefore, the scope of rights of the present disclosure should not be limited to the described embodiments, but should be defined not only by claims set forth below but also by equivalents to the claims.

What is claimed is:

1. A computer-implemented model training method performed by a terminal participating in federated learning, the method comprising:

receiving, from a server for a current federated-learning round, a global neural network model;

maintaining a previous local neural network model trained by the terminal in a preceding federated-learning round;

initializing a current local neural network model based on the global neural network model;

for each local training input:

generating, for each of a plurality of corresponding intermediate layers of the current local neural network model, the previous local neural network model, and the global neural network model, a current representation vector for the current local neural network model, a previous-local representation vector for the previous local neural network model, and a global representation vector for the global neural network model from outputs of the corresponding intermediate layers;

determining, for each of the plurality of corresponding intermediate layers, a layer-wise contrastive representation loss that, when minimized, increases a similarity between the current representation vector and the global representation vector and decreases a similarity between the current representation vector and the previous-local representation vector; and determining a plurality of layer-wise weights by normalizing, across the plurality of corresponding intermediate layers, similarities between the current representation vectors and the global representation vectors;

updating trainable parameters of the current local neural network model based on a local training objective comprising a task loss and a weighted sum of the layer-wise contrastive representation losses, each of the layer-wise contrastive representation losses being weighted by a corresponding one of the plurality of layer-wise weights; and transmitting updated local model parameters of the current local neural network model to the server.

2. A computer-implemented model training method in a federated-learning system including a server and a terminal, the method comprising:

transmitting, by the server to the terminal for a current federated-learning round, a global neural network model;

maintaining, by the terminal, a previous local neural network model trained by the terminal in a preceding federated-learning round;

initializing, by the terminal, a current local neural network model based on the global neural network model;

for each local training input:

generating, by the terminal, for each of a plurality of corresponding intermediate layers of the current local neural network model, the previous local neural network model, and the global neural network model, a current representation vector for the current local neural network model, a previous-local representation vector for the previous local neural network model, and a global representation vector for the global neural network model from outputs of the corresponding intermediate layers;

determining, by the terminal, for each of the plurality of corresponding intermediate layers, a layer-wise contrastive representation loss that, when minimized, increases a similarity between the current representation vector and the global representation vector and decreases a similarity between the current representation vector and the previous-local representation vector; and determining, by the terminal, a plurality of layer-wise weights by normalizing, across the plurality of corresponding intermediate layers, similarities between the current representation vectors and the global representation vectors;

updating, by the terminal, trainable parameters of the current local neural network model based on a local training objective comprising a task loss and a weighted sum of the layer-wise contrastive representation losses, each of the layer-wise contrastive representation losses being weighted by a corresponding one of the plurality of layer-wise weights; and transmitting, by the terminal to the server, updated local model parameters of the current local neural network model.

3. A federated-learning system comprising:

a server comprising a server communicator and a server processor; and a terminal comprising a terminal communicator and a terminal processor, wherein the server processor is configured to transmit, via the server communicator to the terminal for a current federated-learning round, a global neural network model, and wherein the terminal processor is configured to:

receive, via the terminal communicator, the global neural network model;

maintain a previous local neural network model trained by the terminal in a preceding federated-learning round;

initialize a current local neural network model based on the global neural network model;

for each local training input:

generate, for each of a plurality of corresponding intermediate layers of the current local neural network model, the previous local neural network model, and the global neural network model, a current representation vector for the current local neural network model, a previous-local representation vector for the previous local neural network model, and a global representation vector for the global neural network model from outputs of the corresponding intermediate layers;

determine, for each of the plurality of corresponding intermediate layers, a layer-wise contrastive representation loss that, when minimized, increases a similarity between the current representation vector and the global representation vector and decreases a similarity between the current representation vector and the previous-local representation vector; and determine a plurality of layer-wise weights by normalizing, across the plurality of corresponding intermediate layers, similarities between the current representation vectors and the global representation vectors;

update trainable parameters of the current local neural network model based on a local training objective comprising a task loss and a weighted sum of the layer-wise contrastive representation losses, each of the layer-wise contrastive representation losses being weighted by a corresponding one of the plurality of layer-wise weights; and transmit, via the terminal communicator to the server, updated local model parameters of the current local neural network model.

* * * * *